(12) United States Patent
Valentini

(10) Patent No.: US 11,610,475 B2
(45) Date of Patent: Mar. 21, 2023

(54) BATTERY PACK AND ELECTRONIC APPLIANCE HAVING SUCH A BATTERY PACK

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 211 days.

(21) Appl. No.: 17/193,126

(22) Filed: Mar. 5, 2021

(65) Prior Publication Data

US 2021/0312793 A1 Oct. 7, 2021

(30) Foreign Application Priority Data

Apr. 2, 2020 (EP) .................................. 20 167 713

(51) Int. Cl.

| | | |
|---|---|---|
| *G08C 17/02* | (2006.01) | |
| *H01M 50/296* | (2021.01) | |
| *A47L 9/28* | (2006.01) | |
| *A47L 11/40* | (2006.01) | |
| *B24B 23/02* | (2006.01) | |

(Continued)

(52) U.S. Cl.
CPC ............ *G08C 17/02* (2013.01); *A47L 9/2884* (2013.01); *A47L 11/4005* (2013.01); *B24B 23/02* (2013.01); *B25F 5/02* (2013.01); *H01M 10/4257* (2013.01); *H01M 50/296* (2021.01); *H02J 7/0047* (2013.01); *H04L 67/12* (2013.01);

(Continued)

(58) Field of Classification Search
None
See application file for complete search history.

(56) References Cited

U.S. PATENT DOCUMENTS 5,515,303 A 5/1996 Cargin et al.
5,541,985 A * 7/1996 Ishii ...................... G07F 19/208
235/382

(Continued)

FOREIGN PATENT DOCUMENTS

EP 2 628 427 A2 8/2013
EP 2 962 813 A1 1/2016

(Continued)

OTHER PUBLICATIONS

English Abstract of KR20150134128A.
English Abstract of EP 2 628 427.

*Primary Examiner* — Thomas S McCormack
(74) *Attorney, Agent, or Firm* — Ware, Fressola, Maguire & Barber LLP

(57) ABSTRACT

The invention refers to a battery pack (30) comprising a battery pack housing (32) and a battery cell (34) accommodated inside the battery housing (32) and a plurality of battery pack contacts (36) accessible from outside the battery housing (32) and electrically connected to the battery cell (34). The battery pack (30) is adapted to be electrically connected with its battery pack contacts (36) to respective electric appliance contacts (38) of an electronic appliance (2; 100) and to provide electric energy to the electronic appliance (2; 100) after connection thereto. It is suggested that the battery pack (30) comprises a card slot (40) in the battery pack housing (32) with a plurality of electric slot contacts (42) in electric contact with the battery pack contacts (36), and that the battery pack (30) comprises an electronics card (44) for releasable insertion into the card slot (40), the electronics card (44) comprising a wireless communication device (46).

20 Claims, 4 Drawing Sheets

(51) Int. Cl.
*B25F 5/02* (2006.01)
*H01M 10/42* (2006.01)
*H02J 7/00* (2006.01)
*H04L 67/12* (2022.01)
*H04B 1/3822* (2015.01)

(52) U.S. Cl.
CPC ... *H01M 2010/4278* (2013.01); *H04B 1/3822* (2013.01)

(56) References Cited

U.S. PATENT DOCUMENTS

| | | |
|---|---|---|
| 2003/0186592 A1 | 10/2003 | Potega |
| 2003/0201754 A1 | 10/2003 | Conrad |
| 2005/0001585 A1 | 1/2005 | Tashiro |
| 2012/0238119 A1 | 9/2012 | Rejman et al. |
| 2014/0159662 A1* | 6/2014 | Furui ............... G05B 13/024 320/112 |

FOREIGN PATENT DOCUMENTS

| | | |
|---|---|---|
| EP | 3 189 942 A1 | 7/2017 |
| EP | 2 477 790 B1 | 2/2020 |
| KR | 20150134128 A | 12/2015 |
| WO | 2014/135874 A1 | 9/2014 |

* cited by examiner

BATTERY PACK AND ELECTRONIC APPLIANCE HAVING SUCH A BATTERY PACK

BACKGROUND OF THE INVENTION

1. Field of the Invention

The present invention refers to a battery pack comprising a battery pack housing and at least one battery cell accommodated inside the battery housing, and a plurality of electric battery pack contacts accessible from outside the battery housing and electrically connected to the at least one battery cell, the battery pack adapted to be electrically connected with its battery pack contacts to respective electric appliance contacts of an electronic appliance and to provide electric energy to the electronic appliance after connection thereto.

Further, the invention refers to a battery operated electronic appliance comprising an appliance housing and a plurality of electric appliance contacts accessible from outside the appliance housing, and a battery pack of the above-mentioned kind which is releasably attachable and electrically connectable to the electronic appliance.

2. Brief Description of Related Art

Battery operated electronic appliances in the form of hand-held power tools or vacuum cleaners are well known in the prior art. For example, EP 2 628 427 A2 describes such appliances in various embodiments. Conventional battery operated power tools usually comprise a battery pack releasably attached and electrically connected to the power tool housing for operating the power tool by means of electric energy originating from the battery pack. Similarly, battery operated vacuum cleaners usually comprise a battery pack releasably attached and electrically connected to the vacuum cleaner housing for operating the vacuum cleaner by means of electric energy originating from the battery pack. A wireless communication link may be established between the power tool and the vacuum cleaner. To this end, the power tool as well as the vacuum cleaner have to be equipped with respective wireless communication devices (e.g. transmitters and/or receivers). As described in EP 2 628 427 A2, the wireless communication devices usually form an integral part of the respective electronic appliance and are fixedly located inside the appliance housing and integrated into the overall electronic circuitry of the electronic appliance.

This may be a good solution for newly developed and designed power tools and vacuum cleaners which can be equipped with a respective wireless communication device right from the beginning. However, this solution is not applicable for older versions of power tools and vacuum cleaners which are already on the market and are not equipped with a wireless communication device. Currently, it is not possible to upgrade existing battery operated power tools and vacuum cleaners with a wireless communication functionality with a reasonable effort in terms of reconstruction and costs both for the manufacturer and for the user of the electronic appliances.

SUMMARY OF THE INVENTION

Therefore, it is an object of the present invention, to provide for a possibility to upgrade existing battery operated electronic appliances with a wireless communication functionality with a reasonable effort in terms of reconstruction and costs both for the manufacturer and for the user.

This object is solved by a battery pack. In particular, starting from the battery pack of the above-mentioned kind, which also includes a battery pack housing and at least one battery cell accommodated inside the battery pack housing, and electric battery pack contacts accessible from outside the battery pack housing and electrically connected to the at least one battery cell, the battery pack adapted to be electrically connected with the electric battery pack contacts to respective electric appliance contacts of an electronic appliance and to provide electric energy to the electronic appliance after connection thereto, characterized in that the battery pack comprises a card slot in the battery pack housing, the card slot being accessible from outside the battery pack housing and comprising a plurality of electric slot contacts located inside the card slot and in electric contact with the battery pack contacts, and an electronics card adapted for releasable insertion into the card slot, the electronics card comprising a wireless communication device and a plurality of electric card contacts in electric contact with the wireless communication device and adapted to automatically enter into mutual electric contact with the electric slot contacts upon insertion of the electronics card into the card slot.

Preferably, it is suggested that at least one of the card contacts is embodied as a data transmission contact adapted to enter into electric contact with at least one respective data transmission contact of the slot contacts after insertion of the electronic card into the card slot, and/or at least one of the battery pack contacts is embodied as a data transmission contact adapted to enter into electric contact with at least one respective data transmission contact of the appliance contacts of the electronic appliance after connection of the battery pack to the electronic appliance.

According to the above first alternative, data to be transmitted by means of the wireless communication device of an inserted electronics card, is received by the card from the battery pack or its central processing unit, respectively, through the at least one data transmission contact of the slot contacts and of the card contacts. Furthermore, data received via a wireless communication link by means of the wireless communication device, may be forwarded to the battery pack or its central processing unit, respectively, through the at least one data transmission contact of the slot contacts and of the card contacts.

Additionally, a respective signal for initiating the wireless data communication by means of the wireless communication device may be transmitted from the battery pack or its central processing unit, respectively, to the wireless communication device through the at least one data transmission contact of the slot contacts and of the card contacts.

According to the above second alternative, data to be transmitted by means of the wireless communication device of an inserted electronics card, is received by the battery pack or its central processing unit, respectively, from the electronics appliance or its central processing unit, respectively, through the at least one data transmission contact of the appliance contacts and the battery pack contacts. Obviously, the data to be transmitted is then forwarded to the wireless communications device of the inserted electronics card. Furthermore, data received via a wireless communication link by means of the wireless communication device and forwarded to the battery pack or its central processing unit, respectively, may be further forwarded to the electronics appliance or its central processing unit, respectively, through the at least one data transmission contact of the appliance contacts and the battery pack contacts.

The present invention allows an easy and cost efficient update of conventional electronic appliances in order to provide them with a wireless data communication functionality. According to the present invention, not the entire electronic appliance has to be modified and reconstructed in order to achieve a wireless communication functionality, but rather only a small part and a separate component of the appliance, i.e. the battery pack, is modified and reconstructed. If at all, a software (or firmware) modification or update in a central processing unit (CPU) of the electronic appliance may be effected, in order to allow the electronic appliance to control a data communication by means of the wireless communication device. Existing electronic appliances which originally had no wireless communication functionality, can be easily enhanced and provided with a wireless communication functionality simply by connecting a battery pack according to the present invention to the appliance and possibly updating a computer software (firmware) running on a CPU of the appliance.

Furthermore, all new electronic appliances could already be equipped with a respective computer program running on the CPU which allows control of a wireless data communication irrespective of whether the battery pack connected to the appliance is a conventional battery pack or a battery pack according to the present invention. If the battery pack is a conventional battery pack, the electronic appliance would have no wireless data communication functionality. If a battery pack according to the present invention is connected to such a new electronic appliance, it would have a wireless data communication functionality.

For example, the computer software (firmware) running on the CPU of the appliance could have an additional setting or menu for the wireless data communication functionality which could either be automatically activated if a battery pack with an electronics card with a wireless communication device is connected to the electronic appliance. Alternatively, the wireless data communication functionality could be manually activated by a user of the appliance through the setting or the menu of the computer software.

If the wireless data communication functionality is activated, the electronic appliance (e.g. a battery operated hand-held power tool) could transmit data relating to its operational parameters comprising a current on/off-status of the appliance, run-time of the appliance since a task was last performed (e.g. switching on the appliance or replacement of a polishing or sanding member of a polisher or sander), a rotational speed of the appliance, a current operational temperature of the appliance or of part of it, a previous maximum operational temperature of the appliance or of part of it, a current vibration value of the appliance, a previous maximum vibration value of the appliance, a charging state of the battery cells in the battery pack, a unique identifier of the battery pack, of the electronics card or of the wireless communication device, and the like.

The transmitted data may be received by a respective external wireless communication device possibly making part of an external electronic appliance separate from the electronic appliance to which the battery pack is connected. The external appliance could be, for example, a vacuum cleaner, wherein the battery operated hand-held power tool may be pneumatically connected to a suction opening of the vacuum cleaner. The external appliance could adapt or control its own operation based on the content of the data received through the wireless data communication link from the electronic appliance equipped with the battery pack according to the invention.

Alternatively, the external appliance could be, for example, a mobile device of a user of the electronic appliance, e.g. a smart phone, a tablet computer, a laptop computer or the like, having a wireless communication functionality. An application or computer program could be executed on the mobile device. The application or computer program could further process and/or evaluate and/or store and/or display the content of the received data. The application or computer program could also forward the received data and/or its content to a remote server where the data and/or its content from a plurality of different electronic appliances may be collected and processed and/or evaluated and/or stored and/or displayed. The server and/or the application or the computer program could be programmed or operated by the manufacturer or distributor of the electronic appliances. This gives the manufacturer or distributor the possibility to monitor use, quality, weakness and faults of the electronic appliances and to provide for appropriate correction in the design of the electronic appliances, if deemed necessary. Additionally, the manufacturer or distributor could also provide for a remote control of the electronic appliance.

Of course, the electronic appliance equipped with the battery pack according to the invention could also be a battery operated vacuum cleaner or any other type of electronic appliance. In that case, the vacuum cleaner could transmit data relating to its operational parameters comprising a current on/off-status of the appliance, run-time of the appliance since a task was last performed (e.g. switching on the appliance, cleaning or replacement of a filter element or emptying a dust collection container), a current speed the appliance is running at, a current operational temperature of the appliance or of part of it, a previous maximum operational temperature of the appliance or of part of it, a charging state of the battery cells in the battery pack, a unique identifier of the battery pack, of the electronics card or of the wireless communication device, and the like.

The transmitted data may be received by a respective external wireless communication device possibly making part of an external electronic appliance separate from the electronic appliance to which the battery pack is connected. The external appliance could be, for example, a hand-held power tool, which is pneumatically connected to a suction opening of the vacuum cleaner. The external appliance could adapt or control its own operation based on the content of the data received through the wireless data communication link from the electronic appliance equipped with the battery pack according to the invention.

The wireless communication device could comprise a transmitter only, or a receiver only allowing a uni-directional wireless data communication only, or it could comprise a combination of a transmitter and a receiver (a so-called transceiver) allowing a bi-directional wireless data communication across the wireless communication link.

The electronics card could be equipped with its own internal battery for operation of the electronic components of the card and, in particular, the wireless communication device. The battery could be rechargeable or replaceable. Alternatively, the entire electronics card could be replaced in case the battery is discharged. Preferably, the electronics card does not have a separate internal battery. Rather, it is suggested that the wireless communication device of the electronics card is provided with electric energy from the battery pack after insertion of the electronics card into the card slot. The wireless communication device may be provided with electric energy automatically upon insertion of the electronics card in to the card slot and electric contact between the slot contacts and the card contacts. Alternatively, the user may control provision of the wireless communication device with electric energy after insertion of the electronics card in to the card slot, e.g. by means of an electric switch, a setting in a computer program for controlling operation of the wireless communication device or a software command.

Preferably, the battery pack has a sensor element for detecting insertion of an electronics card into the card slot. The sensor element can be an optical sensor, a magnetic sensor, a capacitive sensor, an inductive sensor or the like. Alternatively, the sensor could be a current sensor sensing when the inserted electronics card draws electric energy from the battery pack. The information from the sensor could be used to enable certain functionalities and/or initiate certain tasks in the wireless communication device, the battery pack or the electronic appliance to which it is attached. In order to enable certain functionalities and/or initiate certain tasks in the electronic appliance to which the battery pack is connected, it is suggested that the sensor information is transmitted from the battery pack to the electronic appliance through the battery pack contacts and the respective appliance contacts.

A sensor of the battery pack could be adapted to detect operation of the wireless communication device, i.e. data transmission and/or data reception. Alternatively, the CPU of the electronic appliance controlling the data communication via the wireless communication device has knowledge about operation of the wireless communication device. A CPU of the battery pack or of the electronic appliance may switch the wireless communication device into a sleep mode, in which it consumes less power, if no data is transmitted or received by the wireless communication device. Similarly, the CPU could possibly wake up the wireless communication device from sleep mode and switch it into its normal operation mode, if data is received or data is to be transmitted by the wireless communication device. This could optimize power consumption by the electronics card and significantly increase the life of the battery pack before recharging is necessary.

Preferably, the battery cells are switched together in series and/or in parallel so that the battery pack provides a voltage and a direct current at its battery pack contacts (e.g. one contact for ground ('−') and another contact for a positive voltage ('+')) corresponding to the operating voltage and current of the electronic appliance, to which the battery pack is connected. The operating voltage may be between 12 V and 48 V. The electronics card and in particular the wireless communication device will probably operate at a lower voltage below 12 V, in particular at 2.4 V, 3.7 V or 5.0 V. To this end, it is suggested that the battery pack has a voltage transformer for transforming the operating voltage provided by the battery pack, to the electronic appliance to which it is connected, to the lower voltage required by the electronics card and the wireless communication device, respectively.

According to a preferred embodiment, the battery pack has a central processing unit (CPU) for processing data regarding at least one of
- a current charging condition of the at least one battery cell of the battery pack;
- an operational status of the electronic appliance to which the battery pack is connected;
- a data transmission from and/or to the electronic appliance via one or more of the data transmission contacts of the battery pack contacts and of the electric appliance contacts; and
- a data communication via a wireless data communication link established and set up by the wireless communication device.

The CPU may control charging of the battery cells of the battery pack, e.g. in order to provide the appropriate charging current and to avoid overcharging of the battery cells. The CPU may also participate in the control of the wireless communication device in order to achieve a desired data communication. For example, the CPU could bring data from the electronic appliance to be transmitted by means of the wireless communication device into an appropriate data format and/or encode the data and/or compress the data prior to transmission. The CPU could also bring data received by means of the wireless communication device into an appropriate data format for further processing by the electronic appliance and its CPU, respectively, and/or decode the data and/or decompress the data. Of course, the CPU of the battery pack could perform a plurality of other tasks and functions related to a current charging condition of the battery cells or a data transmission from and/or to the electronic appliance or not related thereto.

It is particularly preferred that the battery pack itself or its central processing unit, respectively, without any control or support from the electronic appliance or its central processing unit, respectively, is adapted to initiate, control and conduct the wireless data communication by means of the wireless communication device of an inserted electronics card. Hence, the wireless communication device is not used for transmitting data received from and regarding an operational status of the electronics appliance, but merely for transmitting data originating from and possibly regarding an operational status of the battery pack. This has the advantage that none of the electronic appliance, its central processing unit and a computer software (e.g. firmware) running thereon have to be updated. The electronic appliance is enhanced with data transmission capability simply by connecting thereto a battery pack according to the present invention.

It is suggested that the battery pack comprises a current sensor element adapted for determining electric current drawn from the battery cells by the electronic appliance during its operation, to which the battery pack is connected. For example, the electronic appliance will draw no or only a small amount of current from the battery cells, if the appliance is not in operation, i.e. an electric motor of the appliance is not running. In contrast thereto, the electronics appliance will draw a larger amount of current when it is in operation, i.e. when its electric motor is running. Hence, by means of the current sensor the battery pack may obtain information regarding the operational status of the electronic appliance to which it is connected. Of course, the current sensor may also be designed such that it does not directly measure the electric current. It could measure another electrical value (e.g. a voltage applied across a shunt resistor) and deduce or determine the electric current therefrom ($I=U/R$). Furthermore, the current sensor could also estimate the electric current drawn by the electronic appliance, based on one or more other electrical and/or physical characteristics and values (e.g. vibrations, temperature, etc.).

Furthermore, according to a particularly preferred embodiment of the invention, it is suggested that a central processing unit of the battery pack is adapted to initiate a wireless data communication via a wireless data communication link established and set up by the wireless communication device depending on the determined electric current. In particular, it is suggested that an ON-signal is transmitted via the wireless data communication link if the amount of electric current drawn by the electronic appliance exceeds a given first threshold value. Alternatively or additionally, an OFF-signal is transmitted via the wireless data communication link if the amount of electric current drawn by the electronic appliance is below a given second threshold value. The first and second threshold values may be the same or different values.

The ON/OFF-signals may be received by a respective external wireless communication device possibly making part of an external electronic appliance separate from the electronic appliance to which the battery pack is connected. For example, if the battery pack according to the invention is attached and electrically connected to a power tool, the battery pack could transmit the ON/OFF-signal to a vacuum cleaner which is automatically turned on and off depending on the received signal and consequently on the current operational state of the power tool. A delay element in the power tool may defer transmission of one or both of the ON/OFF-signals, thereby resulting in a delayed turning on and/or off of the vacuum cleaner. A delay element in the vacuum cleaner may delay turning on and/or off of the vacuum cleaner in response to the received ON/OFF-signal.

According to another preferred embodiment of the invention, it is suggested that the wireless communication device is adapted to automatically establish and set up a wireless radio communication link to a respective external wireless communication device after insertion of the electronics card into the card slot. To this end it is suggested that the wireless communication device automatically searches for possible participants at the intended data communication. The user of the electronic appliance may then select one of the detected possible participants and the wireless radio communication link is automatically established and set up to the selected participant. Alternatively, information about a proposed participant, to which the wireless radio communication link is to be established, is stored in a respective storage device (e.g. a flash memory or the like) of the electronics card and the wireless communication device automatically establishes and sets up the wireless radio communication link to the participant without interaction by the user. For example, it would be possible that the electronics card with the wireless communication device is sold together with a respective electronics card to be inserted into another external electronic appliance, e.g. a vacuum cleaner. The respective information about the wireless communication devices of both electronic cards may be stored in the respective electronics card, e.g. by the manufacturer of the electronics cards. As soon as both electronics cards are in electric contact with the respective electronic appliances, the wireless communication devices of the cards automatically establish and set up the wireless radio communication link.

Preferably, the electronics card comprises an electronic storage unit in which characteristics and properties of a wireless communication link are stored, which is to be established and set up between the wireless communication device of the electronics card and a respective external wireless communication device. The stored information may refer to possible participants at the intended wireless radio communication link, to a certain data format to be transmitted across the link, to a certain communication standard, or the like. The storage unit may also store information about previously established and set up links, in order to facilitate and to speed-up re-establishing the known link, once the wireless communication device is provided with electric energy and within reach/coverage of the participant at the link.

The wireless communication device may be embodied to realize a wireless radio communication link according to one or more known standards or according to any proprietary standard. Preferably, it is suggested that the wireless communication device is adapted to establish and set up a wireless radio communication link to a respective external wireless communication device according to at least one of the following standards:

a WiFi-standard in compliance with IEEE 802.11n,
    a Bluetooth- or Bluetooth-Low-Energy-standard in compliance with IEEE 802.15n,
    a wireless USB (Universal Serial Bus)-standard according to a version of the Wireless USB Specification managed by the USB Implementers Forum,
    a Zigbee-standard in compliance with IEEE 802.15.4,
    a WiGig-standard in compliance with IEEE 802.11ad and IEEE 802.11ay and
    a mobile cellular radio standard including GSM (Global System for Mobile communications; 2G), GPRS (General Packet Radio Service), EDGE (Enhanced Data for Global Evolution), UMTS (Universal Mobile Telecommunications System; 3G), LTE (Long Term Evolution; 4G) and 5G-technology.

Using a well-known radio communication standard has the advantage that standard off-the shelf electronic components may be used for constructing the electronics card and/or the wireless communication device. Furthermore, the developer of the wireless communication device and of the wireless communication link may rely on precisely defined standards and can be sure that two respective wireless communication devices can actually interact and communicate with each other, even if they originate from different manufacturers. Furthermore, possibly a plug-and-play functionality of respective wireless communication devices may be easily realized.

The above-mentioned first five wireless radio communication standards allow high-speed data communication in distances up to several meters and up to some 100 meters. These radio communication standards are preferably used for a communication between an electronic appliance in the form of a battery-operated hand-held power tool and a vacuum cleaner. The mobile cellular radio standards allow data communication in much larger distances as long as the wireless communication devices of both the electronic appliances which are participants at the wireless data communication link are within reach/coverage of a base station of a cellular network according to the respective mobile cellar radio standard.

The electronics card and the interface between the card and the card slot may be designed according to any well-known standard or in any other proprietary way. The dimensions and the form of the card slot are chosen depending on the dimensions and the form of the electronics card to be inserted therein. The card slot should be able to receive and guide the inserted card into its final position in the slot, in which the card contacts are in electric contact with the slot contacts. Furthermore, one or more retention elements could be provided in or at the slot and/or the card in order to hold the inserted card in its final position in the slot. It is suggested that the retention elements automatically enter into mutual engagement once the electronics card is in its final position. The retention elements may be released in order to permit extraction of the electronics card from the slot.

The retention elements may act mechanically or magnetically. Mechanical retention elements could be embodied to hold the card in the slot by means of frictional force, a snap-on connection, a resilient and/or flexible and/or elastic holding member, e.g. a spring element, or the like. Advantageously, the electric contacts of the card slot and of the electronics card comprise plug and socket elements and the plugs are inserted and held in the respective sockets under frictional force, thereby realizing the retention element functionality. In that case no additional separate retention elements are required. Magnetic retention elements could be embodied to hold the card in the slot by means of magnetic force acting between magnetic elements provided in or at the slot or a housing of the battery pack near the slot on the one hand and in or at a casing of the electronics card on the other hand. The magnetic elements of the battery pack and the card may both be embodied as permanent magnets of opposing polarities or one magnetic element as a permanent magnetic and the other magnetic element as a ferromagnetic element.

It is suggested that the electronics card with the card contacts and the card slot with the slot contacts are designed according to at least one of the following standards:

PCMCIA (Personal Computer Memory Card International Association) according to a specification of the PCMCIA, PC Card according to a specification of the PCMCIA, CompactFlash (CF) type I (CF1) or type II (CF2) or CompactFast according to a specification of the CompactFlash Association, in particular to one of the CompactFlash revisions 1.0 to 6.0, USB (Universal Serial Bus) standard for USB type A, type B or type C, in particular according to revisions USB 1.x to USB 4.x, SD (Secure Digital) Card, miniSD Card or microSD Card according to one of the SD Card specifications 1.0 to 7.0 of the SD Card Association.

The PCMCIA-interface was originally designed for laptop-computers. From 1990 onwards, the PCMCIA published and maintained a sequence of standards for parallel communication peripheral interfaces in laptop computers, notably the PCMCIA card, later renamed to PC Card (from version 2 of the specification onwards), and the ExpressCard (2003). The PCMCIA was dissolved in 2009 and all of its activities have since been managed by the USB Implementer's Forum. The PCMCIA standard specifies a removable device measuring 2.126"×3.37" (5.4 cm×8.6 cm). PCMCIA cards have 68 pin assignments, and interface with both 8- and 16-bit buses. Despite the fact that PCMCIA-interfaces are no longer used in recent laptops, it still might be an interface which has advantages when used in the battery pack according to the present invention as an interface between an electronics card with a wireless communication device and a card slot of the battery pack.

CF cards use the Parallel Advanced Technology Attachment (PATA) interface, whereas a variant of CompactFlash, so-called CompactFast cards, use the Serial Advanced Technology Attachment (SATA) interface. Newer versions of the CF cards, so-called XQD cards, are based on the PCI Express interface. The CompactFlash interface is a 50-pin subset of the 68-pin PCMCIA interface. A CF card can be easily slipped into a passive 68-pin PCMCIA Type II to CF Type I adapter that fully meets PCMCIA electrical and mechanical interface specifications. Other adapters are available that allow CF cards to be connected to PCI, IDE and SATA connections. CF cards measure 42.8 mm by 36.4 mm. There are two main subdivisions of CF cards, 3.3 mm-thick type I (CF1) and 5 mm-thick type II (CF2). According to the standard, CF cards are permitted to draw up to 70 mA current (CF1) and up to 500 mA current (CF2), respectively. This is enough to enable safe and reliable operation of the wireless communication device and the transmission of data across the wireless data communication link in an acceptable range (e.g. a couple of meters, preferably up to some 100 meters).

Secure Digital (SD) is a proprietary card format developed by the SD Association (SDA) for use in portable devices like cameras, laptops, smartphones etc. SD cards measure 32 mm×24 mm. Full-size SD cards have a thickness of 2.1 mm. The physical size of miniSD Cards is 21.5 mm×20 mm×1.4 mm. microSD Cards measure 15 mm×11 mm×1.0 mm. Various adapters are available in order to insert and electrically contact miniSD and microSD Cards in a regular SD Card interface or in order to insert and electrically contact miniSD, microSD and SD Cards in a regular USB interface. The miniSD, microSD and SD Cards may draw up to 100 mA current. This is enough to enable safe and reliable operation of the wireless communication device and the transmission of data across the wireless data communication link in an acceptable range.

Universal Serial Bus (USB) is an industry standard that establishes specifications for connectors and protocols for connection, communication and power supply between computers and peripheral devices. The USB standard is currently maintained by the USB Implementers Forum (USB-IF). An interface between the slot contacts and the card contacts according to a USB-standard could be used for data transmission between the electronics card and the battery pack and for electric power supply from the battery cells of the battery pack to the electronics card. The electric contacts are designed such that they also provided for a physical attachment of the electronics card to the battery pack so no additional separate retention elements are required. The electronics card and the card slot could have any desired form as long as the interface corresponds to the USB standard. The card slot would be slightly larger in dimensions than the electronics card.

The object of the present invention is also solved by an electronic appliance comprising the features of claim 10. In particular, starting from the electronic appliance of the above-identified kind, it is suggested that the electronic appliance comprises a battery pack according to the present invention. The electronic appliance may be a battery operated hand-held power tool, in particular a polisher or a sander, or a battery operated vacuum cleaner. The vacuum cleaner may be pneumatically connected to an air outlet port of the power tool through which dust-laden air is conveyed during intended use of the power tool. The connection of the vacuum cleaner to the power tool may be realized by means of a suction tube or hose, which is pneumatically attached to a suction opening of the vacuum cleaner, which opens into a dust collection container of the vacuum cleaner.

Preferably, both the power tool and the vacuum cleaner are equipped with a battery pack according to the present invention in order to enhance their respective functionalities and to realize a wireless data communication functionality between the two electronic appliances, preferably a bi-directional data communication. In that manner, the power tool could transmit data and information regarding its current use and operation to the vacuum cleaner. The vacuum cleaner could use the information, for example, to automatically power up if information is received according to which the power tool is turned on and to power down if information is received according to which the power tool is turned off.

Furthermore, the vacuum cleaner could adjust the speed of its motor and the volume of a suction flow generated depending on the amount of dust and particles in the dust-laden air generated by the power tool during its intended use. The amount of dust and particles in the dust-laden air could be determined, for example, by an optical sensor of the power tool scanning and determining transmissivity of the dust-laden air generated by the power tool.

In the opposite direction, the vacuum cleaner could transmit information and data to the power tool regarding its current use or operational status. For example, the operational speed of the power tool could be reduced or the power tool completely turned off, if a filter element of the vacuum cleaner has not been cleaned for a certain amount of time and/or if it is clogged up. Furthermore, the power tool could output an information to the user indicating that the battery level of the vacuum cleaner is low.

BRIEF DESCRIPTION OF THE DRAWING

Further features and advantages of the present invention will be described in more detail hereinafter with reference to a drawing having the accompanying figures. Individual features of the embodiments shown in the figures could be relevant for the present invention on there own, even though they are shown and described in combination with other features. Further, features shown in the figures and described hereinafter could be combined even though that specific combination is not explicitly shown and described. The drawing includes.

DETAILED DESCRIPTION OF THE BEST MODE OF THE INVENTION

Figure 1:
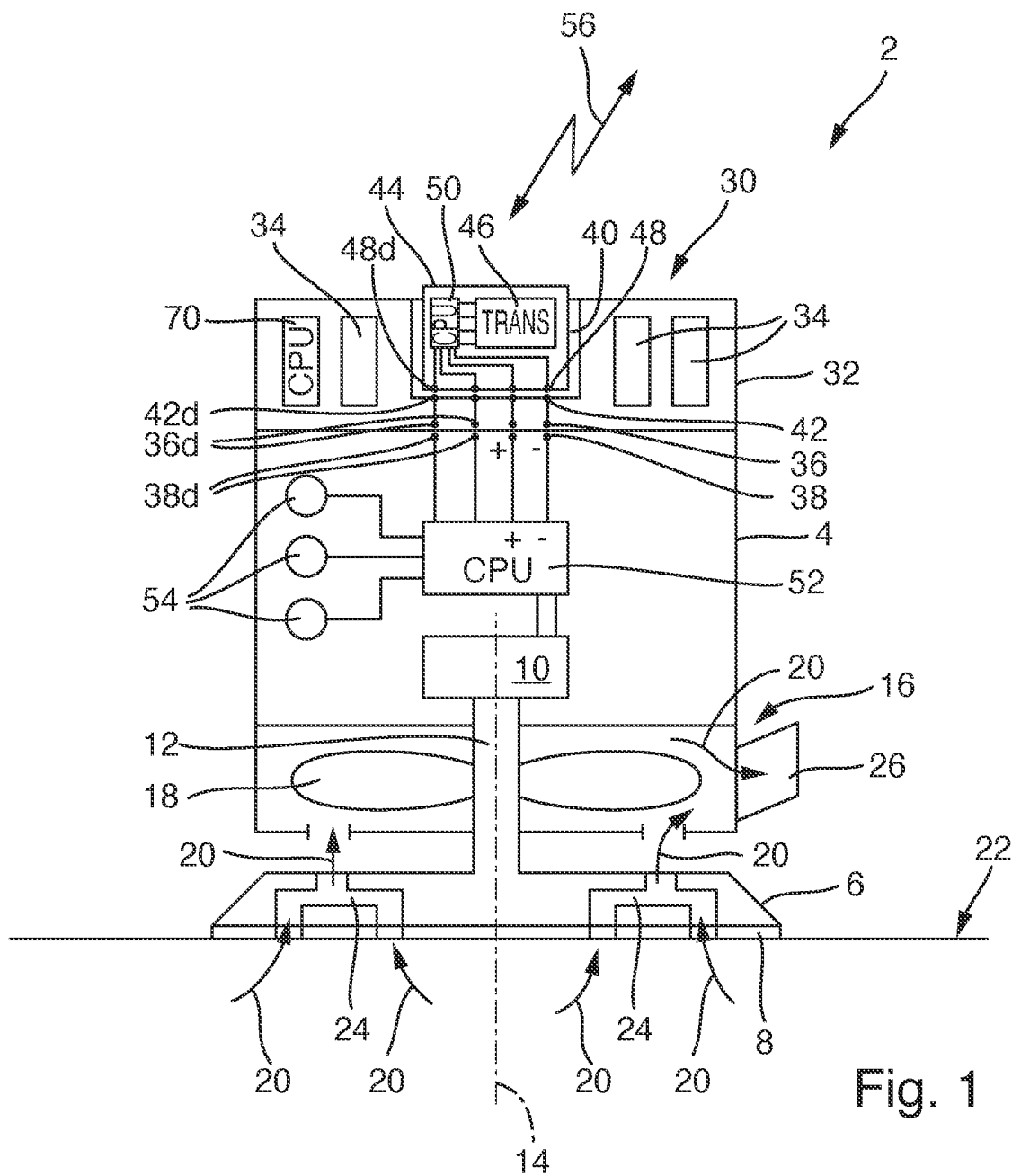
FIG. 1 a schematic view of a first embodiment of an electronic appliance according to the invention to which a battery pack according to the invention is attached and connected.

FIG. 1 shows a schematic view of an electronic appliance according to the present invention in the form of a battery operated hand-held power tool 2 in particular a sander. Of course, the power tool 2 could also be embodied as any other type of battery operated hand-held power tool, e.g. as a drill, a power screwdriver, a power saw, a grinder or the like.

The power tool 2 comprises a housing 4 and a working element 6 protruding therefrom and performing a working movement. In the embodiment of the sander, the working element 6 is realized as a backing pad to which bottom surface a sanding member 8, e.g. in the form of a sanding paper or a sanding fabric, may be releasably attached, e.g. by means of a hook-and-loop fastener (Velcro®). In the embodiment of the sander, the working movement may be a random-orbital movement, a roto-orbital (gear driven) movement or a purely orbital movement. Of course, if the power tool 2 was not embodied as a sander but as a different type of power tool, the working element 6 could be embodied, e.g. as a chuck for a drill or screwdriver, a spindle, a saw blade holder, a grinding disc holder, or the like. Furthermore, in other embodiments of the power tool 2, the working movement could be a purely rotational movement, a linear back-and-forth movement, or the like.

The power tool 2 further comprises an electric motor 10 located in the housing 4 for driving the working element 6 directly or indirectly through a gear mechanism (not shown). In the embodiment of FIG. 1, the working element 6 is directly driven by a motor shaft 12 to which the working element 6 is attached. An eccentric element (not shown) may be located between the motor shaft 12 and the working element 6. The motor shaft 12 may be attached to the eccentric element in a torque proof manner. The working element 6 may be supported by the eccentric element in a freely rotatable manner. By means of the eccentric element a random-orbital working movement of the working element 6 is realized in a plane extending essentially perpendicular to a rotational axis 14 of the motor shaft 12.

The power tool 2 is equipped with a dust extraction system 16 comprising fan blades 18 attached to the tool shaft 12 and rotating therewith. During operation of the power tool 2 the fan blades 18 create an airflow 20. The airflow 20 runs from a working surface 22 on which during the intended use of the power tool 2 the sanding member 8 works, through openings and channels 24 provided in the working element 6 and the respective openings in the sanding member 8, openings in a top surface of the working element 6 into part of the housing 4 accommodating the fan blades 18 and further out of the housing 4 through an air outlet or exhaust opening 26 of the dust extraction system 16. The airflow 20 conveys dust-laden air from the working surface 22 to the exhaust opening 26, thereby keeping the working surface 22 free from dust and small particles and permitting the user to closely inspect the working surface 22 and the working results achieved so far. A vacuum cleaner, like vacuum cleaner 100 from FIGS. 4 and 5, may be pneumatically attached to the exhaust opening 26 by means of a suction tube or hose, thereby aspirating the dust-laden air, separating dust and small particles from the airflow 20 and collecting them in a dust collection container. In this manner the amount of dust and small particles floating in the environmental air surrounding the power tool 2 is significantly reduced.

Of course, it would be possible that the dust extraction system 16 comprises only the exhaust opening 26 without the fan blades 18. Furthermore, the power tool 2 could even be realized without any dust extraction system 16.

The power tool 2 comprises a battery pack 30 which is releasably attached to or inserted in a recess of the housing 4 and electrically connected to the power tool 2. The battery pack 30 has a battery pack housing 32 and at least one battery cell 34 accommodated therein. In the embodiment of FIG. 1, the battery pack 32 comprises four battery cells 34. Of course, the battery pack 30 could comprise more or less than four battery cells 34. The number of battery cells 34 depends on the desired output voltage and current of the battery pack 30. The battery cells 34 can be interconnected in series and/or in parallel in order to achieve the desired output voltage and current of the battery pack 30. The connections between the battery cells 34 and other components of the battery pack 30 are not shown in FIG. 1.

Figure 2:
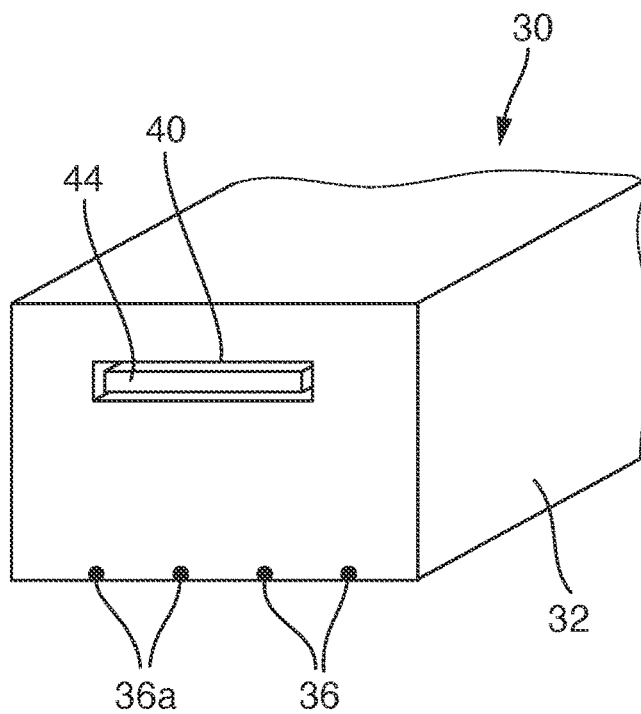
FIG. 2 an embodiment of a battery pack according to the invention in a top perspective view.
Figure 3:
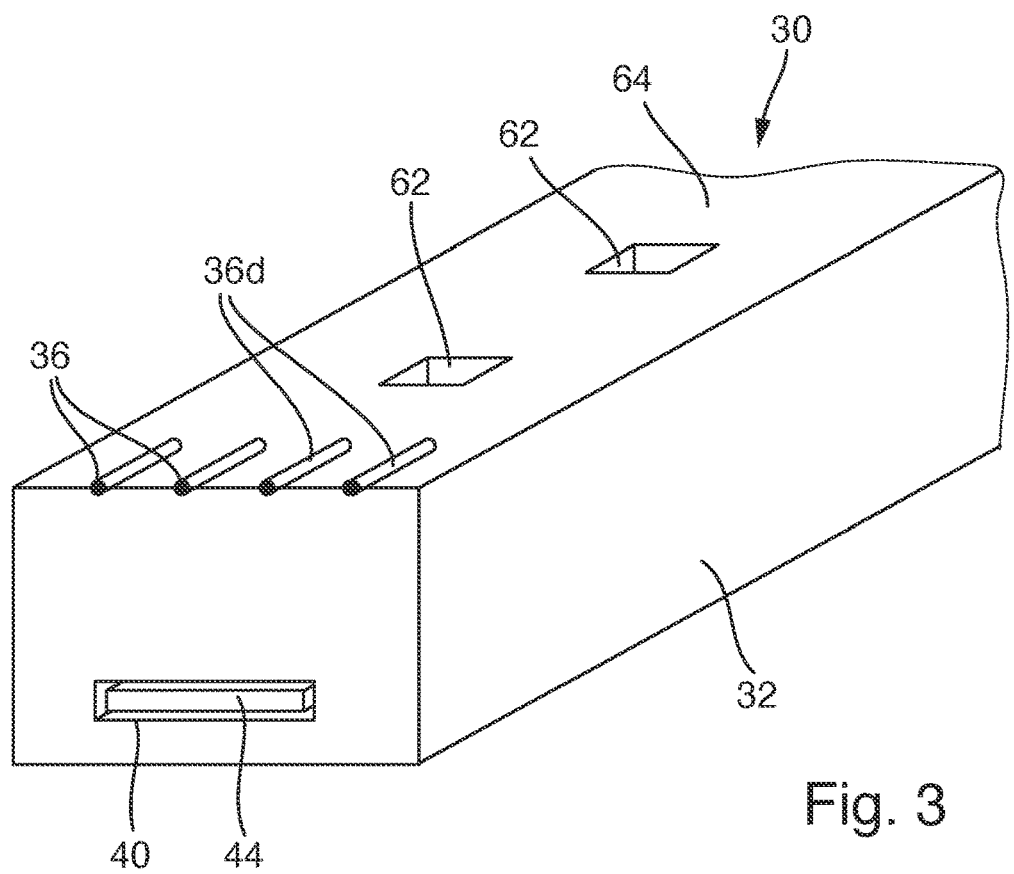
FIG. 3 the battery pack according to the invention in a bottom perspective view.
Figure 5:
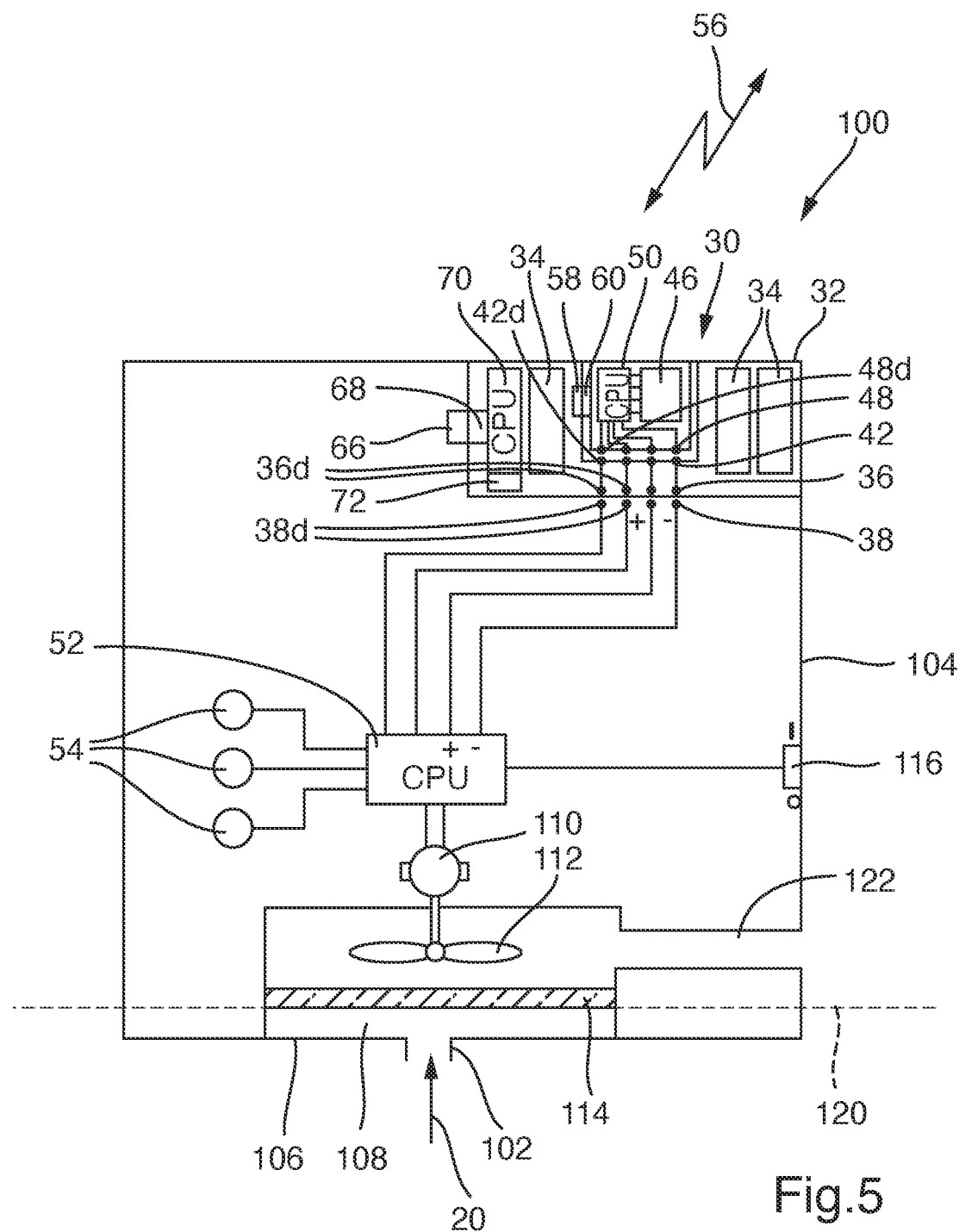
FIG. 5 a schematic view of the electronic appliance of FIG. 4.

Preferably, the battery pack 30 and/or the power tool 2 comprise interacting securing elements, in order to hold the battery pack 30 in its attachment position in respect to the housing 4 of the power tool 2 and to prevent the battery pack 30 from being accidentally or unintentionally separated therefrom. The securing elements are schematically shown in FIG. 5 with a first element 66 attached to the housing 104 or the recess of the electronic appliance 100 and a second element 68 attached to the housing 32 of the battery pack 30. The securing elements 66, 68 may act mechanically or magnetically. Mechanical securing elements 66, 68 could be embodied to hold the battery pack 30 in or at the housing 4 of the power tool 2 by means of frictional force, a snap-on connection, a resilient and/or flexible and/or elastic holding member, e.g. a spring element, or the like. In the embodiment of FIGS. 2 and 3, the battery pack 30 comprises recesses 62 on a surface 64 facing the housing 4 of the power tool 2 when attached to the power tool 2. The recesses 62 are adapted to interact with corresponding protrusions (not shown) of the housing 4 of the power tool 2 when the battery pack 30 is in its attached position. The recesses 62 and the protrusions form the securing elements. Alternatively, magnetic securing elements 66, 68 could hold the battery pack 30 in or at the housing 4; 104 of the electronic appliance 2; 100 by means of magnetic force acting between the battery pack 30 and the housing 4; 104 once the battery pack 30 is in its attached position in respect to the housing 4; 104. The magnetic force could be realized by means of respective magnetic elements comprising permanent magnets of opposing polarities or a permanent magnet and a respective ferromagnetic element.

Further, the battery pack 30 comprises a plurality of electric battery pack contacts 36 accessible from outside the battery housing 32 and electrically connected to the battery cells 34. The battery pack 30 is adapted to be electrically connected with its battery pack contacts 36 to respective electric appliance contacts 38 of an electronic appliance, i.e. the power tool 2, and to provide electric energy to the power tool 2 after connection thereto. In the embodiment of FIG. 1 there are four battery pack contacts 36 and four respective appliance contacts 38. Of course, the number of contacts 36, 38 could differ from what is shown in FIG. 1.

In order to provide for a possibility to upgrade existing battery operated electronic appliances, i.e. known power tools 2, with a wireless communication functionality with a reasonable effort in terms of reconstruction and costs both for the manufacturer and for the user, it is suggested that at least one of the battery pack contacts 36 is embodied as a data transmission contact 36d adapted to enter into electric contact with at least one respective data transmission contact 38d of the power tool 2 after connection of the battery pack 30 to the housing 4 of the power tool 2. The other two battery pack contacts 36 and appliance contacts 38 are preferably adapted for the transmission of electric power from the battery pack 30 to the power tool 2. To this end, it is suggested that one battery pack contact 36 and one respective appliance contact 38 are provided for ground potential ('−') and another battery pack contact 36 and respective appliance contact 38 are provided for a positive voltage ('+').

Further, it is suggested that the battery pack 30 comprises a card slot 40 in the battery pack housing 32. The card slot 40 is accessible from outside the battery pack housing 32 and comprises a plurality of electric slot contacts 42 located inside the card slot 40. The slot contacts 42 are in electric contact with the battery pack contacts 36. Preferably, at least one of the slot contacts 42 is embodied as a data transmission contact 42d in electric contact with at least one respective data transmission contact 36d of the battery pack 30. The other two slot contacts 42 are preferably in contact with the battery cells 34, whereas the connections between the battery cells 34 and the other two slot contacts 42 are not shown in FIG. 1.

The battery pack 30 comprises an electronics card 44 adapted for releasable insertion into the card slot 40. The electronics card 44 comprises a wireless communication device 46 and a plurality of electric card contacts 48. The card contacts 48 are in electric contact with the wireless communication device 46 and are adapted to automatically enter into mutual electric contact with the slot contacts 42 upon insertion of the electronics card 44 into the card slot 40. Preferably, at least one of the card contacts 48 is embodied as a data transmission contact 48d adapted to enter in electric contact with at least one respective data transmission contact 42d of the of the card slot 40 after insertion of the electronics card 44 into the card slot 40. The other two card contacts 48 are preferably adapted to enter in contact with the respective slot contacts 42, which are in contact with the battery cells 34, after insertion of the electronics card 44 into the card slot 40.

The card contacts 48 can be directly connected to the wireless communication device 46 (not shown). Alternatively, as shown in FIG. 1, the card contacts 48 are indirectly connected to the wireless communication device 46 by means of a central processing unit (CPU) 50 of the electronics card 44. Hence, the card contacts 48 are in contact with the CPU 50 providing it with electric energy from the battery cells 34 and (via the data transmission contact 48d) with data to be transmitted by means of the wireless communication device 46. The CPU 50 provides the wireless communication device 46 with the electric energy necessary for its operation and with the data to be transmitted.

The present invention allows an easy and cost efficient update of conventional electronic appliances, i.e. power tools 2, in order to provide them with a wireless data communication functionality. According to the present invention, not the entire power tool 2 has to be modified and reconstructed in order to achieve a wireless communication functionality, but rather only a small part and a separate component of the power tool 2, i.e. the battery pack 30, is modified and reconstructed.

The power tool 2 may comprise a central processing unit (CPU) 52 for controlling operation of the power tool 2. The CPU 52 may receive signals from tool sensors 54 in order to determine a current operation status and use of the power tool. The sensors 54 could comprise a speed sensor for measuring the current speed of the working element 6, a sensor (e.g. an optical sensor) for measuring the content of dust and small particles in the airflow 20 of dust-laden air, a temperature sensor for measuring an operation temperature of the power tool 2, a vibration sensor for measuring current value or a mean value over time of vibrations of the power tool 2, etc. Depending on the sensor signals, the CPU 52 may control operation of the power tool 2.

Further, the battery pack 30 may comprise a central processing unit (CPU) 70 for processing data regarding at least one of a current charging condition of the at least one battery cell 34;

an operational status of the electronic appliance 2; 100 to which the battery pack 30 is connected;

a data transmission from and/or to the electronic appliance 2; 100 via one or more of the data transmission contacts 36d; 38d; and a data communication via a wireless data communication link 56 established and set up by the wireless communication device 46.

If at all, a software (or firmware) modification or update in the CPU 52 may be effected, in order to allow the power tool 2 to control a data communication by means of the wireless communication device 46 of the electronics card 44 inserted into the battery pack 30 connected to the power tool 2. Existing electronic appliances 2 which originally had no wireless communication functionality, can be easily enhanced and provided with a wireless communication functionality simply by attaching and electrically connecting a battery pack 30 according to the present invention to the appliance 2 and possibly updating a computer software (firmware) running on a CPU 52 of the appliance 2.

For example, the computer software (firmware) running on the CPU 52 could have an additional setting or menu for the wireless data communication functionality which could either be automatically activated if a battery pack 30 with an electronics card 44 with a wireless communication device 46 is connected to the electronic appliance 2. Alternatively, the wireless data communication functionality could be manually activated by a user of the appliance 2 through the setting or the menu of the computer software. Furthermore, settings and parameters of the wireless data communication established through the wireless communication device 46 could be manually set by the user through the setting or the menu of the computer software.

All new electronic appliances, like the power tool 2, could already be equipped with a respective computer program running on the CPU 52 which allows control of a wireless communication device 46 irrespective of whether the battery pack connected to the appliance is a conventional battery pack or a battery pack 30 according to the present invention. If the battery pack is a conventional battery pack, the electronic appliance would have no wireless data communication functionality. If a battery pack 30 according to the present invention is connected to such a new electronic appliance, it would have a wireless data communication functionality.

If the wireless data communication functionality is activated, the electronic appliance 2, e.g. the battery operated hand-held power tool 2, could transmit data relating to its operational parameters and settings comprising a current on/off-status of the appliance 2, run-time of the appliance 2 since a task was last performed (e.g. switching on the appliance 2 or replacement of a polishing or sanding member 8 of a polisher or sander 2), a rotational speed of the appliance 2 or its working element 6, a current operational temperature of the appliance 2 or of part of it, a previous maximum operational temperature of the appliance 2 or of part of it, a current vibration value of the appliance 2, a previous maximum vibration value of the appliance 2, a charging state of the battery cells 34 in the battery pack 30, a unique identifier of the battery pack 30 connected to the appliance 2, of the electronics card 44 inserted into the card slot 40 of the battery pack 30 or of the wireless communication device 46 making part of the inserted electronics card 44, and the like. The operational parameters could be determined by means of sensors, like the sensors 54 of the appliance 2.

The transmitted data may be received by a respective external wireless communication device possibly making part of an external electronic appliance separate from the electronic appliance 2 to which the battery pack 30 is connected. The external appliance could be, for example, a vacuum cleaner 100 like the one shown in FIGS. 4 and 5, wherein the battery operated hand-held power tool 2 may be pneumatically connected to a suction opening 102 of the vacuum cleaner 2. The external appliance 100 could adapt or control its own operation based on the content of the data received through the wireless data communication link 56 from the electronic appliance 2 equipped with the battery pack 30 according to the invention.

In the following description we go on the assumption that the power tool 2 is an electronic appliance equipped with a battery pack 30 according to the invention and having a wireless data transmission functionality for transmitting data via a wireless data communication link 56 and that the vacuum cleaner 100 is an external electronic appliance having a wireless data receiving functionality for receiving data via the wireless data communication link 56 from the electronic appliance 2. In order to achieve the wireless data receiving functionality, the vacuum cleaner 100 could also be equipped with a battery pack 30 according to the invention. Alternatively, the wireless data receiving functionality could be an integrated functionality of the vacuum cleaner 100.

Figure 4:
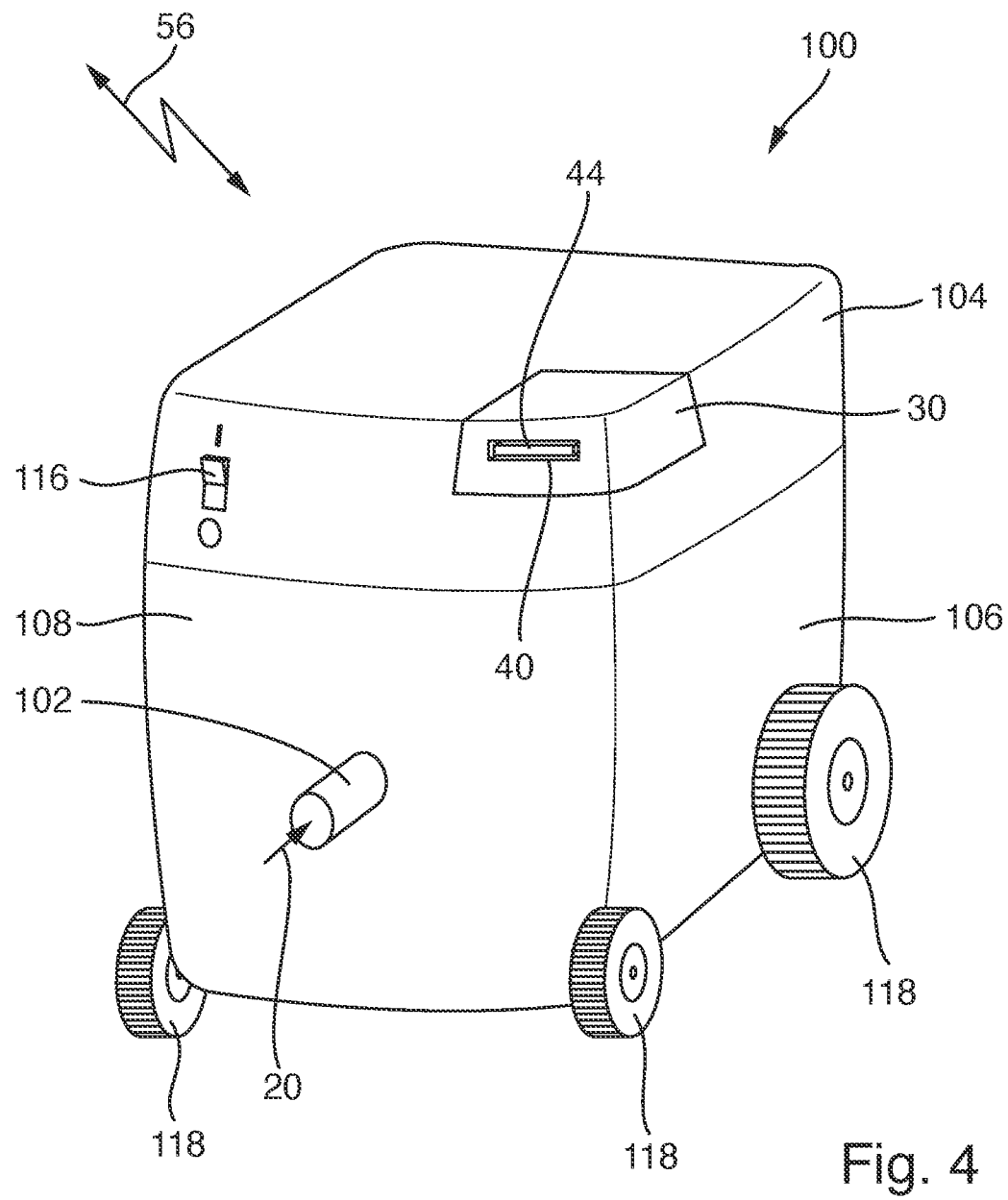
FIG. 4 a second embodiment of an electronic appliance according to the invention to which a battery pack according to the invention is attached and connected.

Of course, the vacuum cleaner of FIGS. 4 and 5 could not only be regarded as an external electronic appliance which receives data across the data communication link 56, but also as an electronic appliance which is equipped with a battery pack 30 according to the present invention and which provides the vacuum cleaner with a wireless data transmission functionality. In that case, for example the power tool 2 of FIG. 1 would serve as an external electronic appliance which receives data from the vacuum cleaner 100 across the data communication link 56. Hence, the data communication link 56 could serve for a uni-directional data transmission from the power tool 2 to the vacuum cleaner 100 as well as from the vacuum cleaner 100 to the power tool 2 and/or for a bi-directional data transmission between the power tool 2 and the vacuum cleaner 100. To this end, the wireless communication device 46 could comprise a transmitter only, or a receiver only allowing a uni-directional wireless data communication only, or it could comprise a combination of a transmitter and a receiver (a so-called transceiver) allowing a bi-directional wireless data communication across the wireless communication link 56.

If the vacuum cleaner 100 was an electronic appliance equipped with the battery pack 30 according to the invention, the vacuum cleaner 100 could transmit data relating to its operational parameters and settings comprising a current on/off-status of the appliance 100, run-time of the appliance 100 since a task was last performed (e.g. switching on the appliance 100, cleaning or replacement of a filter element or emptying a dust collection container), a current speed the appliance 100 or its motor is running at, a current operational temperature of the appliance 100 or of part of it, a previous maximum operational temperature of the appliance 100 or of part of it, a charging state of the battery cells 34 in the battery pack 30 connected to the appliance 100, a unique identifier of the battery pack 30, of the electronics card 44 or of the wireless communication device 46, and the like.

If the vacuum cleaner 100 was an electronic appliance equipped with the battery pack 30 according to the invention, the transmitted data may be received by a respective external wireless communication device possibly making part of an external electronic appliance separate from the electronic appliance 100 to which the battery pack 30 is connected. The external appliance could be, for example, a hand-held power tool, like power tool 2 of FIG. 1, which is pneumatically connected to a suction opening 102 of the vacuum cleaner 100, e.g. by means of a suction tube or hose. The external appliance, e.g. the power tool 2, could adapt or control its own operation based on the content of the data received through the wireless data communication link 56 from the electronic appliance 100 equipped with the battery pack 30 according to the invention.

Now coming back to the embodiment where the power tool 2 is an electronic appliance equipped with a battery pack 30 according to the invention and having a wireless data transmission functionality for transmitting data via the wireless data communication link 56 and where the vacuum cleaner 100 is an external electronic appliance having a wireless data receiving functionality for receiving data via the wireless data communication link 56 from the power tool 2, the process of data transmission is described in more detail:

The CPU 52 and the computer program running on the CPU 52, respectively, control operation of the power tool 2. In particular, the CPU 52 controls the speed of the electric motor 10 and of the working element 6. To this end, the CPU 52 is provided with electric energy from the battery cells 34 of the batter pack 30 through battery pack contacts 36 ('+' and '−') and appliance contacts 38 ('+' and '−') and respective connection lines. The CPU 52 controls the electric current provided to the motor 10 in order to make the motor 10, the tool shaft 12 and/or the working element 6 rotate at a desired speed. During the intended use of the power tool 2, sensors 54 may determine certain system and/or operational parameters and forward the acquired values to the CPU 52. The CPU 52 may use them for controlling operation of the power tool 2.

At least some of the acquired parameters or other data may be selected for transmission to the vacuum cleaner 100 via the wireless data communication link 56. To this end, the CPU 52 initiates data transmission by forwarding the selected data to the electronics card 44 through data transmission contacts 38d of the power tool 2 and data transmission contacts 36d of the battery pack 30. In the shown embodiment, there are two each of the data transmission contacts 36d, 38d. Then, from the data transmission contacts 36d of the battery pack 30 the data to be transmitted is forwarded to the CPU 50 of the electronics card 44 through data transmission contacts 42d of the card slot 40 and data transmission contacts 48d of the electronics card 44. Of course, the number of data transmission contacts 36d, 38d, 42d, 48d could also vary. For example, there could be only one of each of the data transmission contacts 36d, 38d, 42d, 48d, wherein data transmission is effected with reference to the ground potential ('−') of one of the battery pack contacts 36, one of the appliance contacts 38, one of the slot contacts 42 and one of the card contacts 48. In that case there would be only three battery pack contacts 36, three appliance contacts 38, three slot contacts 42 and three card contacts 48.

The CPU 50 processes the received data and brings them into the proper format for wireless data transmission via the wireless communication device 46. For example, the data could be brought into respective data packets, data frames, data segments and/or a data stream to be transmitted via the wireless communication device 46. The data packets, data frames or data segments could be provided with appropriate headers and trailers. The CPU 50 could also compress and/or encode the data. Other data processing could be effected by the CPU 50, too. Of course, the CPU 50 could also be an integral part of the wireless communication device 46.

The CPU 50 receives electric energy form the battery cells 34 of the battery pack 30 through the slot contacts 42 ('+' and '−'), card contacts 48 and respective electric conductors. Alternatively, the electronics card 44 could also be provided with its own battery cell(s) for providing the CPU 50 and the other electronic components of the card 44 with electric energy. The CPU 50 forwards the electric energy to the wireless communication device 46. Alternatively, the wireless communication device 46 could be directly connected to the card contacts 48 ('+' and '−') or to the internal battery cell(s) of the electronics card 44. Further, the CPU 50 forwards the processed data to the wireless communication device 46 for transmission via the wireless communication link 56.

In another embodiment of the present invention, the battery pack 30 could be provided with a CPU (not shown) for controlling at least part of the data transmission via the wireless communication device 46 and/or for taking over at least part of the data processing effected by the CPU 50 of the electronics card 44 prior to the transmission of the data via the wireless communication link 56. The CPU of the battery pack could also control the current charging status and the process of recharging of the battery cells 34.

Preferably, the battery pack 30 has a sensor element 58 (see FIG. 5) for detecting insertion of the electronics card 44 into the card slot 40. The sensor element 58 can be an optical sensor, a magnetic sensor, a capacitive sensor, an inductive sensor or the like. To this end, the card 44 could be provided with a corresponding element 60 adapted to interact with the sensor 58 after insertion of the card 44 into the slot 40. Alternatively, the sensor 58 could be a current sensor sensing when the inserted electronics card 44 draws electric energy from the battery cells 34. The information from the sensor 58 could be used to enable certain functionalities and/or initiate certain tasks in the wireless communication device 46, in the battery pack 30 or in the electronic appliance 100 to which it is connected. In order to enable certain functionalities and/or initiate certain tasks in the electronic appliance 100 to which the battery pack 30 is connected, it is suggested that the sensor information is transmitted from the battery pack 30 to the electronic appliance 100 through the battery pack contacts 36 and the respective appliance contacts 38.

The CPU 52 of the electronic appliance 2 initiates data transmission via the wireless communication device 46. Hence, the CPU 52 has information on when the wireless communication device 46 is in use and when not. The CPU 52 could switch the wireless communication device 46 into a sleep mode, in which it consumes less power, if no data is transmitted or received by the wireless communication device 46. Preferably, in the sleep mode the wireless communication device 46 still is able to receive data or detect data to be received over the wireless communication link 56. Similarly, the CPU 52 could possibly wake up the wireless communication device 46 from sleep mode and switch it into its normal operation mode, if data is received or is to be received or if data is to be transmitted by the wireless communication device 46. This could optimize power consumption by the electronics card 44 and significantly increase the life of the battery cells 34 of the battery pack 30 before recharging is necessary.

Preferably, the battery cells 34 are switched together in series and/or in parallel so that the battery pack 30 provides a voltage and a direct current at its battery pack contacts 36 (e.g. one negative contact 36 for ground (−) and one positive contact 36 (+)) corresponding to the operating voltage and current of the electronic appliance 2, to which the battery pack 30 is connected. The operating voltage may be between 12 V and 48 V. The electronics card 44 and in particular the wireless communication device 46 may operate at a lower voltage below 12 V, in particular at 2.4 V, 3.7 V or 5.0 V. To this end, it is suggested that the battery pack 30 has a voltage transformer (not shown) for transforming the operating voltage provided by the battery pack 30 to the electronic appliance 2, to the lower voltage required by the electronics card 44 and its electronic components, in particular by the wireless communication device 46.

It is suggested that the wireless communication device 46 is adapted to automatically establish and set up the wireless radio communication link 56 after insertion of the electronics card 44 into the card slot 40. To this end it is suggested that the wireless communication device 46 automatically searches for possible participants, e.g. wireless communication devices of external communication devices within reach of the wireless communication device 46, for an intended data communication. The user of the electronic appliance 2 may then select one of the detected possible participants, e.g. the wireless communication device of the vacuum cleaner 100, and the wireless radio communication link 56 is automatically established and set up to the selected participant. Alternatively, information about a proposed participant, to which the wireless radio communication link 56 is to be established, is stored in a respective electronic storage device (e.g. a flash memory or the like) of the electronics card 44 and the wireless communication device 46 automatically establishes and sets up the wireless radio communication link 56 to the participant without interaction by the user.

Preferably, the electronics card 44 comprises the electronic storage device in which characteristics and properties of the wireless communication link 56 are stored, which is to be established and set up between the wireless communication device 46 of the electronics card 44 and a respective wireless communication device of an external electronic appliance, i.e. the vacuum cleaner 100. The stored information may refer to one or more possible participants at the intended wireless radio communication link 56, to a certain data format to be transmitted across the link 56, to a certain communication standard of the line 56, or the like. The storage device may also store information about previously established and set up links 56, in order to facilitate and to speed-up re-establishing of the known link 56, once the wireless communication device 46 is provided with electric energy and within reach/coverage of the participant at the link 56. The electronic storage device may be an integral part of the CPU 50 or of the wireless communication device 46.

The wireless communication device 46 may be embodied to realize a wireless radio communication link 56 according to one or more known standards or according to any proprietary standard. Preferably, it is suggested that the wireless communication device 46 is adapted to establish and set up a wireless radio communication link 56 to a respective wireless communication device of an external electronic appliance according to at least one of the following standards:
- a WiFi-standard in compliance with IEEE 802.11n,
- a Bluetooth- or Bluetooth-Low-Energy-standard in compliance with IEEE 802.15n,
- a wireless USB (Universal Serial Bus)-standard according to a version of the Wireless USB Specification managed by the USB Implementers Forum,
- a Zigbee-standard in compliance with IEEE 802.15.4,
- a WiGig-standard in compliance with IEEE 802.11ad and IEEE 802.11ay and
- a mobile cellular radio standard including GSM (Global System for Mobile communications; 2G), GPRS (General Packet Radio Service), EDGE (Enhanced Data for Global Evolution), UMTS (Universal Mobile Telecommunications System; 3G), LTE (Long Term Evolution; 4G) and 5G-technology.

The electronics card 44 and the mechanical and/or electrical interface between the card 44 and the card slot 40 may be designed according to any well-known standard or in any other proprietary way. The dimensions and the form of the card slot 40 are chosen depending on the dimensions and the form of the electronics card 44 to be inserted therein. The card slot 40 should be able to receive and guide the inserted card 44 into its final position in the slot 40, in which the card contacts 48 are in electric contact with the slot contacts 42. Furthermore, one or more retention elements (not shown) could be provided in the slot 40 and/or at the card 44 in order to hold the inserted card 44 in its final position in the slot 40. It is suggested that the retention elements automatically enter into mutual engagement once the electronics card 44 is in its final position. The retention elements may be released in order to permit extraction of the electronics card 44 from the slot 40.

The retention elements may act mechanically or magnetically. Mechanical retention elements could be embodied to hold the card 44 in the slot 40 by means of frictional force, a snap-on connection, a resilient and/or flexible and/or elastic holding member or the like. In the present case shown in FIG. 1, the slot contacts 42 and the card contacts 48 comprise plug and socket elements and the plugs are inserted and held in the respective sockets by frictional force, thereby realizing the retention element functionality. Hence, the electric contacts 42, 48 provide for an electric connection and at the same time realize the retention elements for holding the card 44 in the slot 40. Alternatively, magnetic retention elements could hold the card 44 in the slot 40 by means of magnetic force acting between the card 44 and the slot 40 once the card 44 has been inserted and is in its final position in the slot 40. The magnetic force could be realized by means of respective magnetic elements comprising permanent magnets of opposing polarities or a permanent magnet and a respective ferromagnetic element.

It is suggested that the electronics card 44 with the card contacts 48 and the card slot 40 with the slot contacts 42 are designed to meet or comply with at least one of the following standards:
- PCMCIA (Personal Computer Memory Card International Association) according to a specification of the PCMCIA,
- PC Card according to a specification of the PCMCIA,
- CompactFlash (CF) type I (CF1) or type II (CF2) or CompactFast according to a specification of the CompactFlash Association, in particular to one of the CompactFlash revisions 1.0 to 6.0,
- USB (Universal Serial Bus) standard for USB type A, type B or type C, in particular according to revisions USB 1.x to USB 4.x,
- SD (Secure Digital) Card, miniSD Card or microSD Card according to one of the SD Card specifications 1.0 to 7.0 of the SD Card Association.

Now, the vacuum cleaner 100 is described in more detail with reference to FIGS. 4 and 5. As mentioned, the vacuum cleaner 100 could act as an external electronic appliance for receiving data from the wireless communication device 46 of the power tool 2 across the wireless data communication link 56. However, the vacuum cleaner 100 could also act as an electronic appliance to which a battery pack 30 with a wireless communication device 46 is connected, which transmits data via the wireless communication link 56.

The vacuum cleaner 100 comprises an essentially two-part housing or casing with an upper part 104 and a lower part 106. The lower part 106 comprises a dust collection container 108 for receiving and storing dust and other small particles which have been filtered out of and extracted from the airflow 20 of dust-laden air aspirated by the vacuum cleaner 100. The upper part 104 of the casing comprises among others at least one electric motor 110 and at least one turbine 112 driven by the motor 110 for creating a low pressure or vacuum (i.e. a pressure below the ambient pressure) in the container 108 and for creating the airflow 20 for the aspiration of dust-laden air. Furthermore, the upper part 104 of the casing comprises one or more air filter elements 114 for filtering dust and small particles out of the aspirated dust laden air. A separation between the upper part 104 and the bottom part 106 is drawn as a dashed line in FIG. 5 and designated with reference sign 120. On the outside of the upper part 4 of the casing, a user interface is provided for the operational control of the vacuum cleaner 100 and its motor(s) 110. In the shown embodiment, the user interface comprises a control switch 116 for turning on ("I") and off ("0") the vacuum cleaner 100. The vacuum cleaner 100 and its motor(s) 110 are operated by means of electric power from the battery packs 30.

The bottom part 106 of the casing may be provided with wheels 118 so the vacuum cleaner 100 can be conveniently rolled over a ground surface from one position to another. Preferably, the front wheels 118 are pivotable about an essentially vertical pivoting axis, in order to allow easy manoeuvring of the vacuum cleaner 100. At least one of the wheels 118 preferably comprises a locking brake for temporarily holding the vacuum cleaner 100 in its current position on the ground surface. Alternatively, the vacuum cleaner 100 could also be embodied as a stationary unit or as a wearable unit which may be carried around by a user by means of a retaining strap or the like, which is slung around the user's waist or over the user's shoulder. Such a wearable vacuum cleaner is described in detail in co-pending application EP 19 211 438.7, filed on Nov. 26, 2019 the content of which is incorporated herein by reference in its entirety.

The dust collection container 108 has a suction opening 102 for the dust-laden air of the airflow 20. The suction opening 102 is located downstream of the motor(s) 110, turbine(s) 112 and filter element(s) 114 and connects the inside of the dust collection container 108 with the environment. Further, the vacuum cleaner 2 comprises an exhaust opening 122 for filtered air located upstream of the filter element(s) 114 and opening into the environment. A pneumatic tube or hose (not shown) with sockets at its distal ends may be attached to the air outlet or exhaust opening 26 of the dust extraction system 16 of the power tool 2 and to the suction opening 102 of the vacuum cleaner 100, thereby pneumatically connecting the vacuum cleaner 100 to the power tool 2.

A battery pack 30 according to the present invention is connected to the vacuum cleaner 100 providing it with a wireless data communication functionality, as previously described in respect to the power tool 2 of FIG. 1. In FIG. 5, matching components were given the same reference signs as in FIG. 1. The functionality of the wireless communication device 46 making part of the electronics card 44 inserted into the card slot 40 of the battery pack 30 is merely the same no matter whether the battery pack 30 is connected to a power tool 2 or to a vacuum cleaner 100.

In FIG. 5 the wireless communication device 46 may receive data from the power tool 2 across the wireless communication link 56. The received data is forwarded to the CPU 50 of the electronics card 44, where it may be extracted and/or decompressed and/or decoded. Then the data is forwarded to the CPU 52 of the vacuum cleaner 100 for further processing. In particular, the data may be used for the control of the vacuum cleaner 100 and of its motor(s) 110. The data is forwarded to the CPU 52 through the electric card contacts 48*d*, the electric slot contacts 42*d*, the electric battery pack contacts 36*d* and the electric appliance contacts 38*d*. The further processing of the data by means of the CPU 52 may also comprise an extraction and/or a decompression and/or decoding of at least part of the received data.

Of course, as mentioned above, the wireless communication device 46 of the battery pack 30 connected to the vacuum cleaner 100 could also be used for transmitting data by means of the wireless data communication link 56 to the power tool 2. The process for data transmission merely corresponds to what was previously described in respect to the data transmission by means of the wireless communication device 46 of the battery pack 30 connected to the power tool 2.

It is particularly preferred that the battery pack 30 itself or its central processing unit 70, respectively, is adapted to initiate, control and conduct the wireless data communication by means of the wireless communication device 46 of an inserted electronics card 44 without any control or support from the electronic appliance 2; 100 or its central processing unit 52, respectively, to which the battery pack 30 is connected. Hence, the wireless communication device 46 is not used for transmitting data received from and regarding an operational status of the electronics appliance 2; 100, to which the battery pack 30 is connected, but merely for transmitting data originating from and possibly regarding an operational status of the battery pack 30. This has the advantage that none of the electronic appliance 2; 100, its central processing unit 52 and a computer software (e.g. firmware) running thereon have to be updated. The electronic appliance 2; 100 is enhanced with data transmission capability simply by connecting thereto the battery pack 30 according to the present invention.

It is suggested that the battery pack 30 comprises a current sensor element 72 (see FIG. 5) adapted for determining electric current drawn from the battery cells 34 by the electronic appliance 2; 100, to which the battery pack 30 is connected, during operation of the appliance 2; 100. The current sensor element 72 may be part of the CPU 70 or separate therefrom. For example, the electronic appliance 2; 100 will draw no or only a small amount of current from the battery cells 34, if the appliance 2; 100 is not in operation, i.e. an electric motor 10; 110 of the appliance 2; 100 is not running. In contrast thereto, the electronics appliance 2; 100 will draw a larger amount of current when it is in operation, i.e. when its electric motor 10; 110 is running. Hence, by means of the current sensor 72 the battery pack 30 may obtain information regarding the operational status of the electronic appliance 2; 100 to which it is connected, without the necessity of any data transmission contacts 36*d*, 38*d* between the appliance 2; 100 and the battery pack 30.

Of course, the current sensor 72 may also be designed such that it does not directly measure the electric current. It could measure another electrical value (e.g. a voltage applied across a shunt resistor) and deduce or determine the electric current therefrom (I=U/R). Furthermore, the current sensor 72 could also estimate the electric current currently drawn by the electronic appliance 2; 100, based on one or more other electrical and/or physical characteristics and values (e.g. vibrations, temperature, etc.).

Furthermore, it is suggested that the central processing unit 70 of the battery pack 30 is adapted to initiate a wireless data communication via the wireless data communication link 56 established and set up by the wireless communication device 46 depending on the determined electric current. In particular, it is suggested that an ON-signal is transmitted via the wireless data communication link 56 if the amount of electric current drawn by the electronic appliance 2; 100 exceeds a given first threshold value. Alternatively or additionally, an OFF-signal is transmitted via the wireless data communication link 56 if the amount of electric current drawn by the electronic appliance 2; 100 is below a given second threshold value. The first and second threshold values may be the same or different values.

The ON/OFF-signals may be received by a respective external wireless communication device possibly making part of an external electronic appliance separate from the electronic appliance 2; 100 to which the battery pack 30 is connected. For example, if the battery pack 30 is attached and electrically connected to a power tool 2, the battery pack 30 could transmit the ON/OFF-signal to a vacuum cleaner 100 which is automatically turned on and off depending on the received signal and consequently on the current operational state of the power tool 2. A delay element in the power tool 2 may defer transmission of one or both of the ON/OFF-signals, thereby resulting in a delayed turning on and/or off of the vacuum cleaner 100. A delay element in the vacuum cleaner 100 may delay turning on and/or off of the vacuum cleaner 100 in response to the received ON/OFF-signal received from the battery pack 30.

The invention claimed is:

1. Battery pack comprising a battery pack housing and at least one battery cell accommodated inside the battery pack housing and electric battery pack contacts accessible from outside the battery pack housing and electrically connected to the at least one battery cell, the battery pack adapted to be electrically connected with the electric battery pack contacts to respective electric appliance contacts of an electronic appliance and to provide electric energy to the electronic appliance after connection thereto,
wherein the battery pack comprises
a card slot in the battery pack housing, the card slot being accessible from outside the battery pack housing and comprising a plurality of electric slot contacts located inside the card slot and in electric contact with the battery pack contacts, and
an electronics card adapted for releasable insertion into the card slot, the electronics card comprising a wireless communication device and a plurality of electric card contacts in electric contact with the wireless communication device and adapted to automatically enter into mutual electric contact with the electric slot contacts upon insertion of the electronics card into the card slot.

2. Battery pack according to claim 1, wherein
at least one of the electric card contacts is embodied as a data transmission contact adapted to enter into electric contact with at least one respective data transmission contact of the slot contacts after insertion of the electronic card into the card slot, and/or
at least one of the electric battery pack contacts is embodied as a data transmission contact adapted to enter into electric contact with at least one respective data transmission contact of the electric appliance contacts after connection of the battery pack to the electronic appliance.

3. Battery pack according to claim 1, wherein the wireless communication device of the electronics card is provided with electric energy from the at least one battery cells of the battery pack after insertion of the electronics card into the card slot.

4. Battery pack according to claim 1, wherein the wireless communication device of the electronics card is a wireless radio transceiver for transmitting and receiving data across a wireless data communication link.

5. Battery pack according to claim 1, wherein the battery pack comprises a sensor element for detecting insertion of the electronics card with the wireless communication device into the card slot.

6. Battery pack according to claim 1, wherein the electronics card has a central processing unit for processing data to be transmitted or received via the wireless communication device.

7. Battery pack according to claim 1, wherein the battery pack comprises a central processing unit for processing data regarding at least one of
a current charging condition of the at least one battery cell;
an operational status of the electronic appliance to which the battery pack is connected;
a data transmission from and/or to the electronic appliance via one or more of the data transmission contacts; and
a data communication via a wireless data communication link established and set up by the wireless communication device.

8. Battery pack according to claim 1, wherein the battery pack comprises a current sensor element adapted for determining electric current drawn from the at least one battery cells by the electronic appliance during its operation to which the battery pack is connected.

9. Battery pack according to claim 8, wherein the battery pack comprises a central processing unit adapted to initiate a data communication via a wireless data communication link established and set up by the wireless communication device depending on the determined electric current, wherein an ON-signal is transmitted via the wireless data communication link if the amount of electric current drawn by the electronic appliance exceeds a given threshold value, and/or an OFF-signal is transmitted via the wireless data communication link if the amount of electric current drawn by the electronic appliance is below the given threshold value.

10. Battery pack according to claim 1, wherein the battery pack is adapted to receive a data transmission initiation signal and/or data to be transmitted via the wireless communication device of the electronics card from the electronic appliance to which the battery pack is connected.

11. Battery pack according to claim 1, wherein the wireless communication device is adapted to automatically establish and set up a wireless radio communication link to a respective wireless communication device of an external electronics appliance after insertion of the electronics card into the card slot of the battery pack connected to the electronics appliance.

12. Battery pack according to claim 1, wherein the electronics card comprises an electronic storage unit configured to store characteristics and properties of a wireless communication link, which is to be established and set up between the wireless communication device of the electronics card inserted into the card slot of the battery pack connected to the electronics appliance and a respective wireless communication device of an external electronics appliance.

13. Battery pack according to claim 1, wherein the wireless communication device is adapted to establish and set up a wireless radio communication link to a respective wireless communication device of an external electronics appliance according to at least one of the following standards:
- a WiFi-standard in compliance with IEEE 802.11n,
- a Bluetooth- or Bluetooth-Low-Energy-standard in compliance with IEEE 802.15n,
- a wireless USB-standard according to the Wireless USB Specification of the USB Implementers Forum,
- a Zigbee-standard in compliance with IEEE 802.15.4,
- a WiGig-standard in compliance with IEEE 802.11ad and IEEE 802.11ay and
- a mobile cellular radio standard including GSM (Global System for Mobile communications; 2G), GPRS (General Packet Radio Service), EDGE (Enhanced Data for Global Evolution), UMTS (Universal Mobile Telecommunications System; 3G), LTE (Long Term Evolution; 4G) and 5G-technology.

14. Battery pack according to claim 1, wherein a mechanical and/or electrical interface between the electronics card with the electric card contacts and the card slot with the electric slot contacts are designed according to at least one of the following standards:
- PCMCIA (Personal Computer Memory Card International Association) according to a specification of the PCMCIA,
- PC Card according to a corresponding specification of the PCMCIA,
- CompactFlash (CF) type I (CF1) or type II (CF2) or CompactFast according to a specification of the CompactFlash Association, including to one of the CompactFlash revisions 1.0 to 6.0,
- USB (Universal Serial Bus) standard for USB type A, type B or type C, including according to revisions USB 1.x to USB 4.x,
- SD (Secure Digital) Card, miniSD Card or microSD Card according to one of the SD Card specifications 1.0 to 7.0 of the SD Card Association.

15. Battery operated electronic appliance comprising
an appliance housing and the respective electric appliance contacts accessible from outside the appliance housing, and
the battery pack according to claim 1 that is releasably attached and electrically connected to the appliance housing.

16. Battery operated electronic appliance according to claim 15, wherein the battery operated electronic appliance is a battery operated hand-held power tool, including a polisher or a sander, or a battery operated vacuum cleaner.

17. Battery pack according to claim 2, wherein the wireless communication device of the electronics card is provided with electric energy from the at least one battery cells of the battery pack after insertion of the electronics card into the card slot.

18. Battery pack according to claim 2, wherein the wireless communication device of the electronics card is a wireless radio transceiver for transmitting and receiving data across a wireless data communication link.

19. Battery pack according to claim 2, wherein the battery pack comprises a sensor element for detecting insertion of the electronics card with the wireless communication device into the card slot.

20. Battery pack according to claim 2, wherein the electronics card has a central processing unit for processing data to be transmitted or received via the wireless communication device.

* * * * *